May 29, 1956 J. J. HANNAFIN 2,747,477
QUICK-CONVERTIBLE CAMERA BACK
Filed April 23, 1953 2 Sheets-Sheet 1
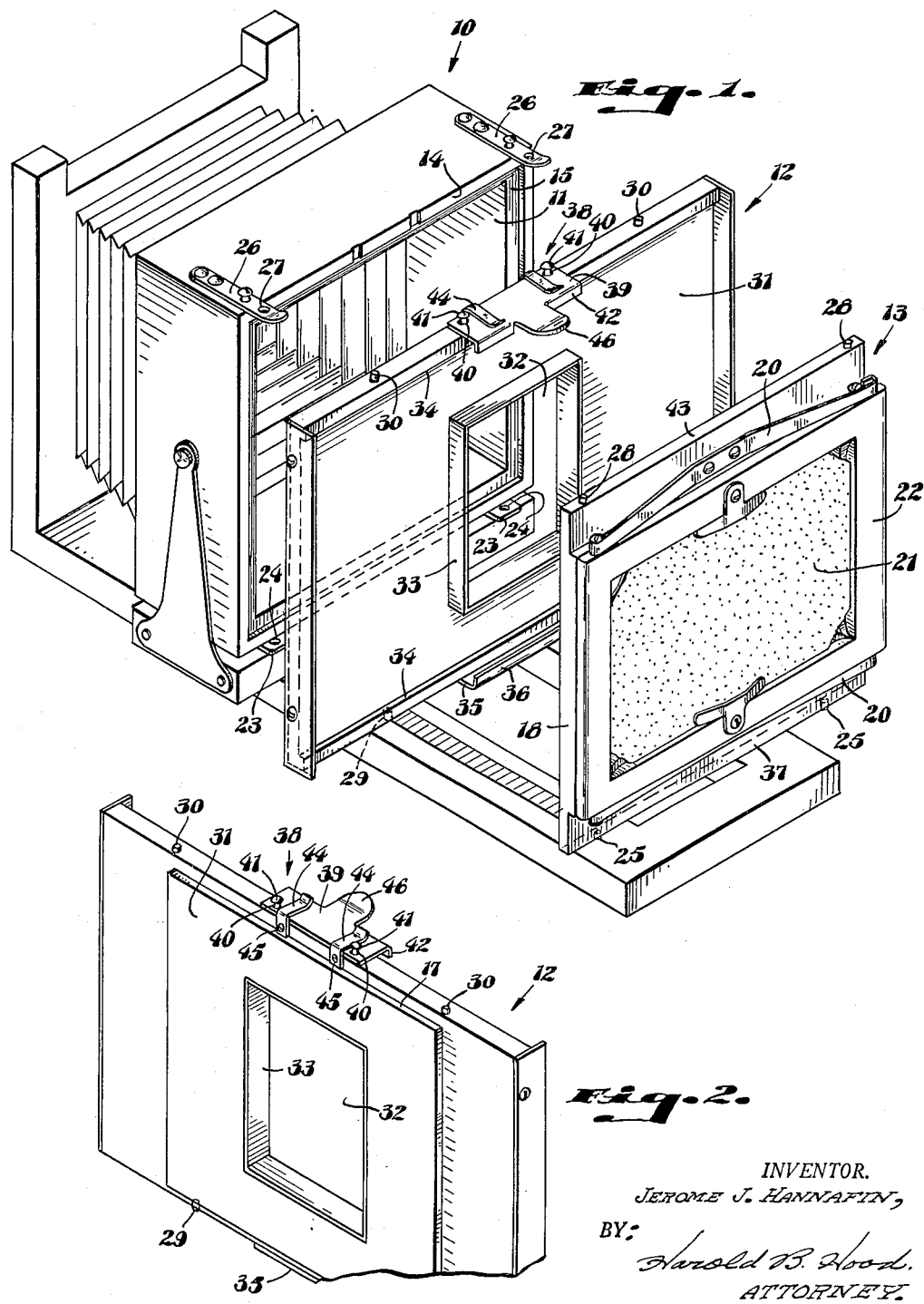
INVENTOR.
JEROME J. HANNAFIN,
BY:
Harold B. Hood.
ATTORNEY.

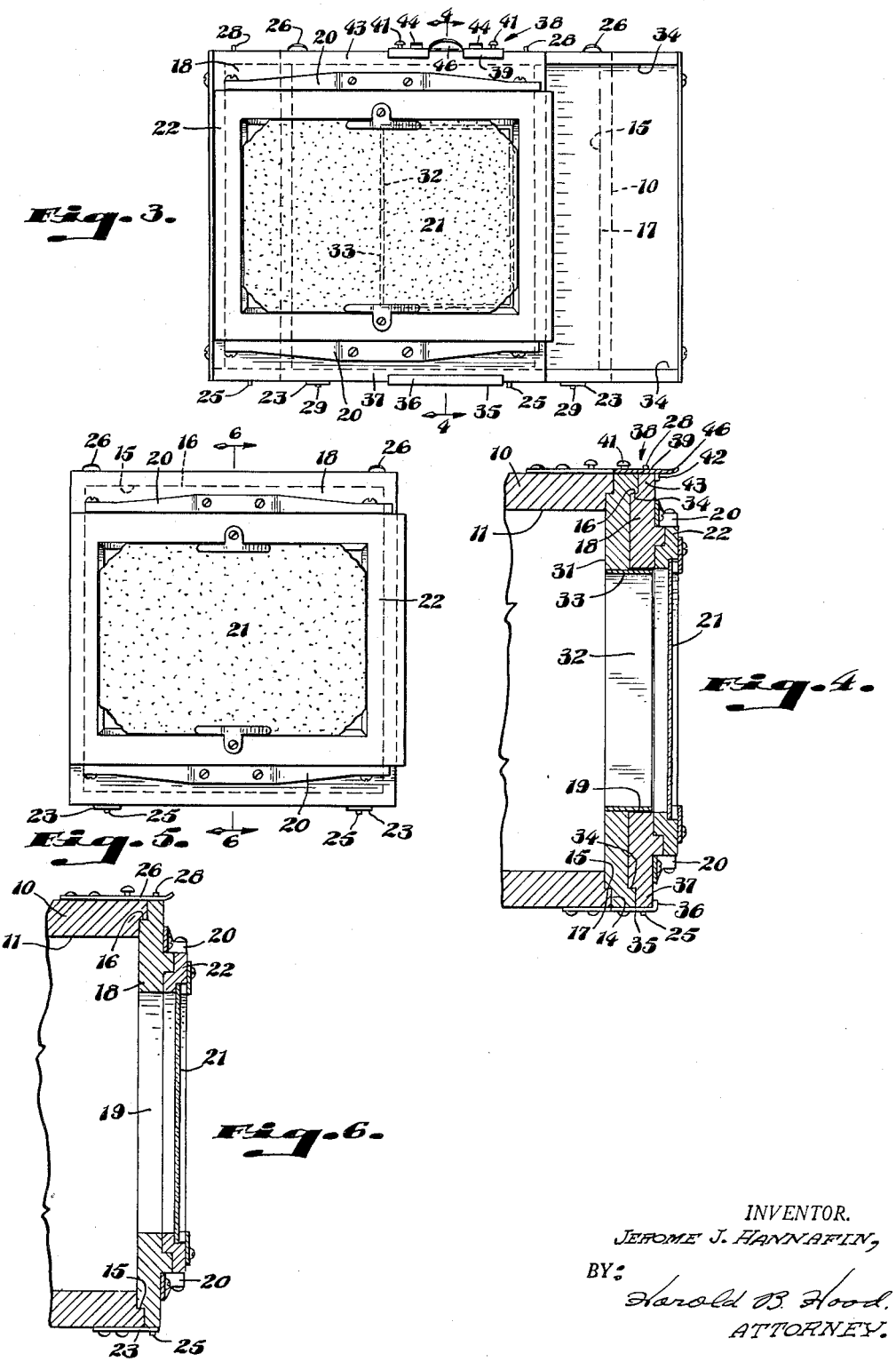

United States Patent Office 2,747,477
Patented May 29, 1956

2,747,477
QUICK-CONVERTIBLE CAMERA BACK

Jerome J. Hannafin, Indianapolis, Ind.

Application April 23, 1953, Serial No. 350,547

6 Claims. (Cl. 95—36)

The present invention relates to camera and particularly to that type having a film exposure aperture in the rear thereof adapted to be closed alternatively with a stationary-type, single-exposure back member, or a sliding-type, multiple-exposure back member.

The primary object of my invention is to provide a compound back member for such a camera which can be quickly converted to form the single-exposure type back or the multiple-exposure type back; and, to this end, to provide such a compound back comprising two parts, one of the parts being a film carrying frame which can be fixed directly on the camera to constitute the single-exposure back member, or which can be removably and slidably fixed to the second part of the compound back, the second part then being fixed to the camera to constitute the multiple-exposure back.

A further object is to provide a novel guide-forming latch means for releasably attaching the film carrying frame on the said second part whereby said two parts can be quickly assembled or disassembled without the need for any special tools.

Further objects of the invention will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is an exploded perspective view of a camera embodying a preferred form of my invention;

Fig. 2 is a perspective view of the supporting frame constituting a part of my invention but looking from the rear of the frame as shown in Fig. 1;

Fig. 3 is a rear elevation of a camera showing my invention in place thereon in the form in which multiple film exposures can be had;

Fig. 4 is a transverse sectional view through the device of Fig. 3 taken substantially on the line 4—4 thereof;

Fig. 5 is a view similar to Fig. 3 but showing the use of my invention in which a single film exposure only can be had; and Fig. 6 is a transverse sectional view taken substantially on the line 6—6 of Fig. 5.

Referring more particularly to the drawings, and especially to Fig. 1, it will be seen that I have illustrated, more or less diagrammatically, a camera 10 having an aperture 11 in the rear therof behind which the film is placed for exposure.

According to conventional practice, two types of film carrying backs must be provided for such a camera, one type being fixed over aperture 11 and supporting a film, the entire surface of which is exposed upon the opening of the camera shutter. The other type back is fixed over aperture 11 and has an aperture therein somewhat smaller than the aperture 11, the film being carried by a sliding frame mounted on the apertured member, this frame being slidable edgewise to position first one and then another portion of the film surface behind the smaller aperture, whereby only a portion of the entire film surface will be exposed upon opening of the camera shutter.

My invention contemplates the provision of but a single back member which can be quickly and simply converted to form the equivalent of either of the two types of back members above-mentioned. To this end, I provide two separable members, one carrying a latch member engageable with the other member to permit easy assembly or disassembly of the two said members.

Of the two said members, one comprises a supporting frame, referred to generally by the reference numeral 12: and the other comprises a film carrying frame, referred to generally by the reference numeral 13. Camera 10 has a seating surface 14, surrounding aperture 11, here shown guarded by a perimetral recess 15. Frame 13 is provided with a perimetral flange portion 16 adapted for telescopic reception in recess 15 when frame 13 is seated on surface 14 to provide a light-tight seal between the camera and frame 13.

Supporting frame 12 is similarly provided with a perimetral flange portion 17 (Fig. 2) adapted for telescopic reception in recess 15 when frame 12 is seated on surface 14, likewise to provide a light-tight seal between camera 10 and frame 12.

Frame 13 is a more or less conventional type film holding frame used with this type camera. A base member 18 (providing the flange 16) has an aperture 19 therethrough and supports, by means of spring leaves 20, 20, a focusing screen 21 carried on a frame member 22. Springs 20, 20 are yieldable to permit the movement of frame member 22 away from member 18 for the insertion of a film holder between such members with the film thereon covering aperture 19 in such frame.

For attaching the frame 13 to the camera, a pair of spaced elements 23, 23 are carried by the camera, each having a hole 24 therein (Fig. 1). Pins 25, 25 are carried by frame 13 for registry with holes 24. Spring leaves 26, 26 are provided on the camera opposite elements 23, 23, each having a hole 27 therein. Further pins 28, 28 are carried by frame 13 for registry with holes 27. Pins 25 are first entered in holes 24; flange 16 is then seated in recess 15; and, at the same time, spring leaves 26 are flexed to permit the entrance of pins 28 into holes 27. When so assembled, the entire surface of the film carried in frame 13 will be exposed upon a single opening of the camera shutter.

Supporting frame 12 is provided with a pair of pins 29, 29 along one edge thereof, spaced according to the spacing of pins 25, 25 on frame 13. This frame is further provided with a second pair of pins 30, 30 spaced according to the spacing of pins 28, 28 on frame 13. To mount frame 13 on the camera, pins 29, 29 are first entered in holes 24 in the elements 23, 23, flange 17 is seated in recess 15, and, at the same time, spring leaves 26, 26 are flexed to permit the entrance of pins 30, 30 into holes 27 in such leaves.

Supporting frame 12 comprises a light impervious surface 31 having an aperture 32 therein guarded by a perimetral flange member 33, projecting beyond the surface 31. The lateral dimensions of aperture 32 are here shown to be approximately one-half that of camera aperture 11, and, when frame 12 is positioned in camera 10, the median vertical plane through the camera will pass substantially through the vertical median line through aperture 32. Thus, surface 31 of frame 12 acts as a mask over a portion of camera aperture 11 so that a smaller area of film surface will be exposed on the opening of the camera shutter.

Along two of the opposite edges of frame 12, the recess 14 is duplicated in cross-section to define, in effect, spaced, mutually facing, parallel rail members 34, 34 extending along such opposite edges. Because of this duplication of the recess 15, the assembly of the film carrying frame 13 on frame 12 becomes a comparatively simple matter. The oppositely facing portions of flange portion 16 are merely inserted between the mutually facing rail surface 34. Thus, the frame 13 is positioned for edgewise sliding movement on frame 12. Flange member 33 on frame 12 is dimensioned to fit neatly between the upper and lower boundaries of aperture 19 in frame 13. The sides of member 33 act to limit the sidewise movement of frame 13.

To hold the frame 13 in such association on frame 12, I provide a bracket element 35 along one edge of frame 12 adjacent one of the rail members 34. This bracket provides a lip 36 turned toward the other rail 34 to define a channel opening toward said other rail. The edge 37 of frame 12 is enterable in this channel.

On the opposite edge of frame 12, I provide a second bracket element forming a latch and referred to generally by the reference numeral 38, comprising an elongated plate 39 having a pair of holes 40, 40 therein. Frame 12 supports a pair of headed pins 41, 41 taken loosely through holes 40 to mount said plate for swinging movement about one edge thereof. A lip 42 is turned out of the plane of plate 39 toward bracket 35 to define a channel opening toward said bracket. By swinging plate 39 about said one edge thereof, the edge 43 of frame 13 can be entered into said channel. Frame 13 is then held securely in association with frame 12.

Springs 44, here shown in the form of leaves fixed to frame 12, as at 45, engage against plate 39 to urge the lip 42 thereon toward bracket 35, thereby preventing the accidental separation of the two frame members.

Preferably, a manipulating finger-piece 46 is provided on plate 39 for facilitating the swinging of plate 39 when assembling or disassembling the two frames.

The use of my invention eliminates the need for two back members. The provision of the bracket 38 forming a quick-release latch, permits easy and quick assembly or disassembly of the frames 12 and 13. And, because of the duplication of the seating surface of camera 10 on frame 12, film carrying frame 13 can be attached to either the camera or frame 12 thereby eliminating the necessity for another frame 13 to be used when the exposure of the entire film surface is desired.

I claim as my invention:

1. For use with a camera having a film exposure aperture in the rear thereof with a seating surface surrounding said aperture, a compound back member for said camera to close said aperture, said back member being quickly convertible from a sliding-type, multiple-exposure back to a stationary-type, single-exposure back, said back member comprising a film carrying frame having a perimetral flange portion adapted to be telescopically receivable in the camera aperture to form a light-tight seal about said aperture when said film carrying frame is positioned in said camera, latch means carried by said camera and engageable with said film carrying frame to releasably retain it in such position, a supporting frame having a diminutive aperture therein and a flange portion similar to the flange portion on said film carrying frame, said flange portion being telescopically receivable in the camera aperture to form a light-tight seal about said aperture when said supporting frame is positioned on said camera with the aperture in said supporting frame in registry with the said aperture in said camera, said latch means being engageable with said supporting frame to releasably retain it in such position, said supporting frame being further provided with a pair of spaced, mutually facing, parallel rail members along opposite edges thereof, the flange portions of said film carrying frame being enterable between said rail members to guide said film carrying frame for edgewise movement on said supporting frame between a position in which one portion of the surface of the film in said film carrying frame is positioned behind the aperture in said supporting frame and a position in which another portion of such film surface is positioned behind said aperture, a first bracket mounted along one edge of said supporting frame adjacent one of said rail members and providing a lip turned toward the other of said rail members to define a channel opening toward said other rail member, one edge of said film carrying frame being enterable in said channel when said film carrying frame is positioned on said supporting frame, a second bracket, mounting means for said second bracket supporting said bracket along the opposite edge of said supporting frame, said second bracket providing a lip turned toward said first bracket to define a channel between said lip and the adjacent rail member opening toward the opposite rail member, the opposite edge of said film carrying frame being enterable in said channel after said one edge thereof has been so entered in the first said channel, said second bracket being movable to shift the lip thereon toward and away from the other said bracket to permit the entrance and removal of the said opposite edge of said film carrying frame into and out of the channel defined by the lip of said second bracket, and resilient means engaging said second bracket to urge the lip thereon toward the first said bracket.

2. The device of claim 1 in which the mounting means for said second bracket comprises hinge means carried by said supporting frame and supporting said second bracket for swinging movement about the edge thereof opposite the lip thereon, said resilient means comprising spring means carried by said supporting frame and engaging said bracket to urge it as aforesaid.

3. The device of claim 1 in which said second bracket comprises an elongated plate having a plurality of holes therethrough, said lip being turned out of the plane of said plate along one of the longer edges thereof, said mounting means comprising a like plurality of headed pins taken loosely through respective ones of said holes and supported from said supporting frame to permit the swinging of said plate about the edge thereof opposite the lip thereon, the said resilient means being supported from said supporting frame and engaging said plate to urge the lip thereon as aforesaid.

4. The device of claim 3 in which said resilient means comprises a leaf-spring having one end thereof fixed to said supporting frame and the other end thereof overlying and biased against said plate.

5. The device of claim 3 including a manipulating finger-piece carried by said plate and projecting therefrom beyond the lip thereon.

6. For use with a camera having a film exposure aperture in the rear thereof with a seating surface surrounding said aperture, a compound back member for said camera to close said aperture, said back member being quickly convertible from a sliding-type, multiple-exposure back to a stationary-type, single-exposure back, said back member comprising a film carrying frame having a perimetral flange portion adapted to be telescopically associated with said camera seating surface to form a light-tight seal about said aperture when said film carrying frame is positioned on said camera, cooperating latch means carried by said camera and by said film carrying frame to releasably secure said frame to said camera, a supporting frame having a diminutive aperture therein and a flange portion similar to the flange portion on said film carrying frame, said flange portion being adapted to be telescopically associated with said camera seating surface to form a light-tight seal about said aperture when said supporting frame is positioned on said camera with the aperture in said supporting frame in registry with the said aperture in said camera, latch means on said supporting frame and cooperative with said latch means on said camera to secure said supporting frame to said camera, said supporting frame being further provided with a pair of spaced, mutually facing, parallel rail members along opposite edges thereof, the flange portions of said film carrying frame being enterable between said rail members to guide said film carrying frame for edgewise movement on said supporting frame between a position in which one portion of the surface of the film in said film carrying frame is positioned behind the aperture in said supporting frame and a position in which another portion of such film surface is positioned behind said aperture, a first bracket mounted along one edge of said supporting frame adjacent one of said rail members and providing a lip turned toward the other of said rail members to define a channel opening toward said other rail member, one edge of said film carrying frame being enterable in said channel when said film carrying frame is positioned on said supporting frame, a second bracket, mounting means for said second bracket supporting said bracket along the opposite edge of said supporting frame, said second bracket providing a lip turned toward said first bracket to define a channel between said lip and the adjacent rail member opening toward the opposite rail member, the opposite edge of said film carrying frame being enterable in said channel after said one edge thereof has been so entered in the first said channel, said second bracket being movable to shift the lip thereon toward and away from the other said bracket to permit the entrance and removal of the said opposite edge of said film carrying frame into and out of the channel defined by the lip of said second bracket, and resilient means engaging said second bracket to urge the lip thereon toward the first said bracket.

References Cited in the file of this patent

UNITED STATES PATENTS

| | | |
|---|---|---|
| 771,282 | Smith | Oct. 4, 1904 |
| 833,886 | Locke | Oct. 23, 1906 |
| 953,005 | Goddard | Mar. 22, 1910 |
| 1,544,970 | Folmer | July 7, 1925 |
| 1,726,313 | Ray | Aug. 27, 1929 |
| 1,933,889 | Burnell | Nov. 7, 1933 |
| 2,584,311 | Wells | Feb. 5, 1952 |